UNITED STATES PATENT OFFICE.

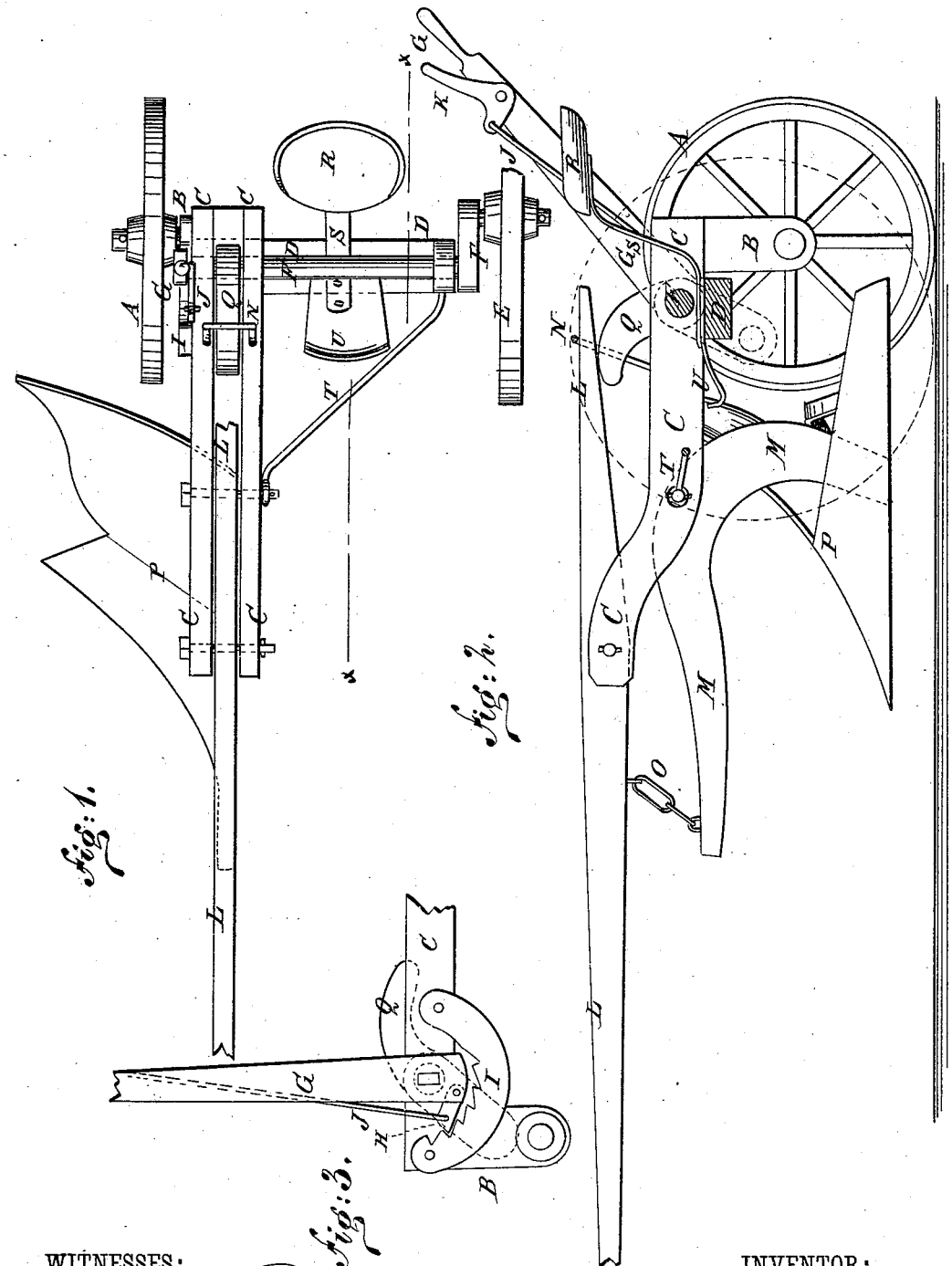

FRANCIS M. FOSTER, OF COFFEYVILLE, KANSAS, ASSIGNOR TO HIMSELF AND ELISHA GALLUP, OF SAME PLACE.

SULKY-PLOW.

SPECIFICATION forming part of Letters Patent No. 226,739, dated April 20, 1880.

Application filed July 22, 1879.

*To all whom it may concern:*

Be it known that I, FRANCIS MARION FOSTER, of Coffeyville, in the county of Montgomery and State of Kansas, have invented a new and useful Improvement in Sulky-Plows, of which the following is a specification.

Figure 1 is a top view of my improved plow. Fig. 2 is a side view of the same, partly in section, through the line $x\,x$, Fig. 1. Fig. 3 is a detail view of the device for raising and lowering the plow.

The object of this invention is to furnish an improved sulky-plow which shall be so constructed that the plow shall be in front of the wheel, so that the plowman can see the plow and the team without changing his position; which shall be convenient in use, being easily raised out of and from the ground for turning and passing from place to place; which shall be simple and strong in construction, inexpensive in manufacture, will be always level, will require but one lever for its various adjustments, and shall have the furrow-wheel in rear of the plow, so as to be unaffected by inequalities of surface.

The invention consists in the combination of the cam with the movable crank-axle, the arms, the tongue, the plow-beam, and the lever, as hereinafter fully described.

Similar letters of reference indicate corresponding parts.

A is the furrow-wheel, which revolves upon the journal of the crank-axle B, rigidly attached to the rear ends of the arms C, or to the end of the cross-bar D, attached to the said arms C.

E is the land-side wheel, which revolves upon the journal of the crank-axle F. The crank-axle F turns in bearings attached to or formed upon or in the cross-bar D and the arms C. The crank-axle F is turned to raise and lower the land-side wheel by a lever, G, rigidly attached to the end of the said crank-axle F. To the lower end of the lever G is pivoted the pawl H, which engages with the ratchet-teeth formed upon the concave side of the curved bar, I attached at its ends to the arms C.

To the pawl H is attached the lower end of a rod, J, which passes up along the side of the lever G, and is attached at its upper end to the short arm of a small bent lever, K. The lever K is pivoted at its angle to the upper part of the lever G in such a position that its upper arm may be conveniently reached and operated by the hand that grasps the handle of the said lever G.

C are two parallel arms, the rear parts of which are rigidly attached to the cross-bar D, and which are placed at such a distance apart as to receive the tongue L and the plow-beam M between them. The rear part of the arms C are horizontal, and their forward parts are curved upward and forward. To and between the forward ends of the arms C is pivoted the tongue L, the rear end of which extends back above the rear parts of the arms C, and to or nearly to the crank-axle F, and is kept in position laterally by passing through a loop or keeper, N, attached to the rear part of the said arms C.

M is the plow-beam, the forward end of which is connected with the tongue L by a short chain, O, to prevent the forward end of the said beam M from swinging down when the plow P is raised from the ground. The middle part of the plow-beam M is pivoted to and between the arms C at the beginning of their upward curve.

To the crank-axle F, between the arms C, is rigidly attached a cam, Q, which, as the said crank-axle F is turned to lower the land-side wheel E, comes in contact with the lower side of the rear end of the tongue L, and causes the tongue L and the arms C to operate as a compound lever to raise the plow out of or from the ground. By this construction the sulky will be kept level however the plow may be adjusted.

R is the driver's seat, which is attached to the upper end of the spring-standard S, the lower end of which is bent forward and rests upon the upper side of the cross-bar D, and has holes or a slot formed in it to receive the bolt or bolts by which it is secured to the said cross-bar D, so that the said seat may be adjusted to cause the driver's weight to balance the machine. The connection between the arms C and the cross-bar D is strengthened by a brace, T, the forward end of which is attached to the said arms C and its rear end to the said cross-bar D.

U is the foot-board, which is attached to the cross-bar D to receive and support the driver's feet.

Having thus fully described my invention, I claim as new and desire to secure by Letters Patent—

1. The combination of the lever G, provided with the cam Q, the curved ratchet-bar I, with the crank-axle F, the tongue L, the arms C, and the cross-bar D, substantially as herein shown and described.

2. The combination of the cam Q with the movable crank-axle F, the arms C, the tongue L, the plow-beam M, and the lever G, substantially as herein shown and described.

FRANCIS MARION FOSTER.

Witnesses:
W. A. PEFFER,
WM. A. PEFFER, Jr.